United States Patent [19]

Chen et al.

[11] Patent Number: 4,908,921
[45] Date of Patent: Mar. 20, 1990

[54] METHOD OF MAKING CAPACITIVE PRESSURE SENSORS

[75] Inventors: Frank Chen, Swindon; Tony W. Rogers, Stoke Poges, both of England; David E. Blackaby, West Suffield, Conn.

[73] Assignee: Spectrol Reliance Limited, Swindon, England

[21] Appl. No.: 227,848

[22] Filed: Aug. 3, 1988

[30] Foreign Application Priority Data

Aug. 6, 1987 [GB] United Kingdom ............... 8718639

[51] Int. Cl.$^4$ ............................................... H01G 5/02
[52] U.S. Cl. ....................................... 29/25.41; 73/724; 361/278; 361/279; 361/283; 427/81
[58] Field of Search ............................ 29/25.41, 25.42; 73/724; 361/283, 278, 279, 285; 427/79, 81

[56] References Cited

U.S. PATENT DOCUMENTS

| | | | |
|---|---|---|---|
| 3,117,365 | 1/1964 | Belko, Jr. ........................ | 29/25.42 |
| 4,184,189 | 1/1980 | Davis et al. ..................... | 29/25.41 X |
| 4,261,086 | 4/1981 | Giachino et al. ................ | 29/25.41 |
| 4,415,948 | 11/1983 | Grantham et al. ............... | 361/283 |
| 4,586,109 | 4/1986 | Peters et al. .................... | 29/25.41 X |

Primary Examiner—Carl E. Hall

[57] ABSTRACT

A method of batch producing capacitive pressure sensors in which a sheet of semiconductive material is provided with an insulating layer 4 on one side thereof and a plurality of cavities 1 are formed in the semiconductive sheet by removing part of the insulating layer and part of the semiconductive sheet. Simultaneously with producing the cavities in the semiconductive sheet, at least one recess is provided, again by removing part of the insulating layer and part of the semiconductive sheet. The semiconductive sheet is then bonded to a non-conductive substrate 3 to form a composite sheet with the insulating layer 4 in contact with the substrate, the substrate being provided with a number of electrodes 5 corresponding to the number of cavities in the semiconductive sheet and arranged such that they are located within the cavities on bonding of the semiconductive sheet to the substrate, each electrode having an electrical feedthrough 6 extending therefrom and terminating at a point outside of the associated cavity but within an associated recess in the semiconductive sheet. The bonded composite sheet is patterned with a series of grid lines to delineate the plurality of pressure sensors and the semiconductive sheet is scored from the side opposite that provided with the insulating layer so as to break into each recess to reveal, at a stage in the method of production, the terminal end of each electrical feedthrough 6, and the bonded composite sheet is diced along the grid lines so as to separate the pressure sensors one from another.

18 Claims, 8 Drawing Sheets

METHOD OF MAKING CAPACITIVE PRESSURE SENSORS

CROSS REFERENCE TO RELATED APPLICATION

This application is related to U.S. Ser. No. 7/227,849 (UTC Docket No. HCI-361-SR), corresponding to British Application No. 8718637.

This invention relates to capacitive pressure sensors, that is pressure sensors which employ a diaphragm, the movement of which due to changes in pressure varies the capacitance of the sensor and thus provides an output representative of the applied pressure.

Capacitive pressure sensors are well known and are employed in capacitance transducers, microphones, rupture discs, resonators, vibrators and like devices. Many of the applications for such capacitive pressure sensors require that the sensors be extremely small, for example of the order of 4 mm×4 mm, and hence the sensors are difficult to handle and hence difficult to produce on a one-by-one basis.

The object of the present invention is to provide a method of batch producing capacitive pressure sensors.

According to one aspect of the present invention, there is provided a method of batch producing capacitive pressure sensors comprising the steps of:

(a) providing an electrically insulating layer on one side of a sheet of a semiconductive material, (b) forming an array of cavities in said sheet by removing at least part of the insulating layer, the remaining portions of the sheet acting as a diaphragm, the cavities being arranged in a plurality of rows and columns on the semiconductive sheet, (c) forming at least one recess of a predetermined depth in the semiconductive sheet in association with each cavity by removing at least part of the insulating layer, (d) bonding the semiconductive sheet to a non-conductive substrate to form a composite sheet with the insulating layer in contact with the substrate, the substrate being provided with electrodes for the cavities in the semiconductive sheet and arranged such that they are located within the cavities on bonding of the semiconductive sheet to the substrate, each electrode having an electrical feedthrough extending therefrom and terminating at a point outside the associated cavity, (e) providing delineation lines for the plurality of pressure sensors, (f) cutting the semiconductive sheet from the side opposite that provided with the insulating layer to a depth, and at a position, so as to break into each recess to reveal, at a stage in the method, the terminal end of each electrical feedthrough, and (g) dicing the composite sheet along the delineation lines so as to separate the pressure sensors one from another.

Each recess may open to at least two sides of the associated sensor when the latter is finally formed, and the associated electrical feedthrough may terminate within the recess if an electrical lead is to be attached directly thereto once the terminal end is revealed. However, if a planarised electrical connection technique is to be used, each feedthrough extends beyond the associated recess, the latter serving, together with the related cut, to insulate the main body of the semiconductive sheet from that portion in contact with the feedthrough and to which portion an electrical connection for the feedthrough is made.

Although it is preferable to provide an insulating layer of a thickness such that the cavities can be formed by removing only a part of that layer, it may be necessary in some instances to remove also part of the adjacent semiconductive sheet. Removal of the insulating layer and, when necessary, the semiconductive sheet may be effected by etching and it will be appreciated that to involve a single etching step in relation to the insulating layer is simpler and less expensive than having to involve a second etching step in relation to the semiconductive sheet. Furthermore, the simple etching step in relation to the insulating layer can be achieved with a greater accurancy, namely ±1%, compared with an accuracy of 35 5% in relation to the etching of the semiconductive sheet. If the whole of the insulating layer is to be removed, an autostop etching technique can be employed by which the etching process will automatically terminate when the semiconductive sheet is reached.

The cut may be arranged to delineate two corner regions of each sensor and may be at an angle of the order of 45° to the scribe lines. Alternatively, the cuts may be parallel to an edge of each sensor so as to delineate a strip at that edge of the sensor.

The cutting step may be implemented prior to the dicing step, whereby the latter results in portions of the semiconductive sheet delineated by the cuts being removed to reveal the terminal end of each electrical feedthrough for subsequent connection to external electrical circuitry. However, these steps may be reversed so that dicing is effected first and then each individual sensor is cut to reveal the terminal end of the or each electrical feedthrough associated therewith.

The shape of the cavities, as seen in plan view, may be circular although other shapes, such as rectangles or triangles, enables the packing density to be increased.

Batch production may be further facilitated by employing a semiconductor sheet of a thickness greater than that ultimately required for the diaphragm of each sensor, thus making the semiconductive sheet more handleable, and then reducing the thickness of the semiconductive sheet to the required thickness prior to the dicing step.

This step of reducing the thickness of the semi-conductive sheet can be employed in other methods of producing capacitive pressure sensors, whereby according to a second aspect of the present invention there is provided a method of producing a capacitive pressure sensor comprising the steps of:

(a) forming at least one cavity in a sheet of semiconductive material, (b) bonding the sheet of semiconductive material to a non-conductive substrate, whereby at least one totally enclosed cavity is produced with the portion of the semiconductive sheet forming one side of the cavity in use serving as a diaphragm, and (c) removing part of said portion of the semiconductive sheet acting as a diaphragm from the side of the semiconductive sheet opposite to that which is bonded to the substrate so as to provide the diaphragm with a predetermined thickness appropriate to the required pressure range of the sensor.

It will be appreciated that this second aspect of the present invention provides a highly advantageous method of manufacturing capacitive pressure sensors of various ranges in as much as the basic fabrication of all of the sensors can be identical with one simple thickness-reducing step, such as by lapping, being used to trim the sensors to the required sensitivity.

The parasitic capacitance of a capacitive pressure sensor can be minimised by maximising the thickness of the insulating layer on the semiconductive sheet but there is a trade off between maximising the thickness of the oxide layer and effective bonding of the conductive sheet. It is desirable to monitor the parasitic capacitance of the sensors during manufacture and in the batch production thereof in accordance with the first aspect of the present invention there may be included a further step of providing a dummy feedthrough for a predetermined selection of pressure sensors, each of which dummy feed-throughs is essentially identical to the feedthrough associated with the electrode of the corresponding sensor but electrically disconnected from the electrode. Assuming the insulating layer to be of uniform thickness, the variable capacitance of a sensor according to the applied pressure is given by subtracting the dummy capacitance from the actual capacitance. Thus the said selected sensor provided with dummy electrodes can be used as a quality control tool for the related batch of sensors.

According to a third aspect of the present invention there is provided a method of producing a capacitive pressure sensor comprising the steps of:
 (a) forming at least one cavity in a sheet of semiconductive material
 (b) bonding the sheet of semiconductive material to a non-conductive substrate, whereby at least one totally enclosed cavity is produced with the portion of the semiconductive sheet forming one side of the cavity in use serving as a diaphragm, the cavity-forming step comprising forming a peripheral recess around the or each cavity, the depth of the peripheral recess being varied to alter the pressure range of the sensor.

The peripheral recess may be in the form of a trench, the recess aiding the bonding process, and producing a more linear capacitive/pressure response.

The semiconductive sheet may be a doped p-type or n-type silicon but may be any other semiconductive material such as germanium, for example. The substrate or other member on which the electrode and one or more feedthroughs are provided for each sensors is preferably a glass having a coefficient of thermal expansion and Poisson's ratio well matched to the semiconductive material employed as well as a high volume resistivity. Using silicon as the semi-conductive material, a glass known as Corning 7070 or Schott 8248 has proved to be particularly advantageous in producing a pressure sensor with excellent thermal stability and low hysteresis.

Capacitive pressure sensors in accordance with the present invention will now be described in greater detail by way of example, with reference to the accompanying drawings, in which.

Figure 1:
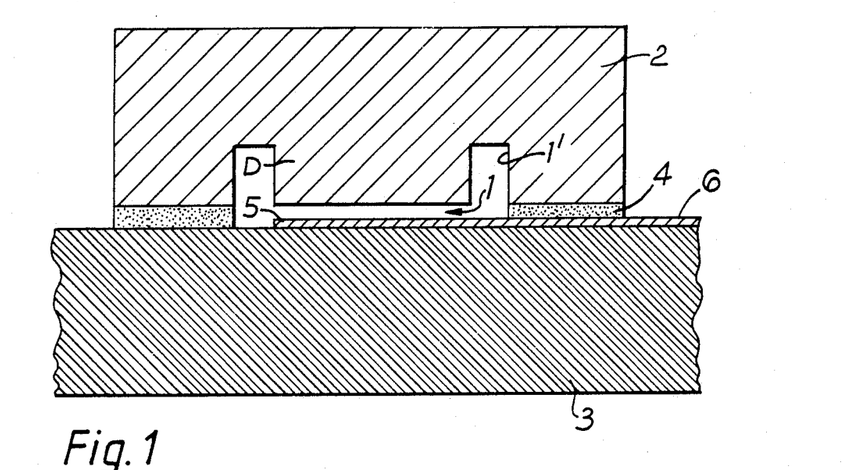
FIG. 1 is a cross-sectional view of one pressure sensor in accordance with the present invention.

Referring first to FIG. 1, a capacitive pressure sensor in accordance with the present invention is illustrated in cross-section and comprises a cavity 1 which is formed in a sheet 2 of semiconductive material, preferably silicon, by etching. The cavity is closed by bonding the semiconductive sheet 2 to a substrate 3 which is non-conductive and is conveniently in the form of a glass, the use of Corning 7070 or Schott 8248 glass being particularly advantageous. The semiconductive sheet 2 is provided with an electrically insulating layer or facing 4, preferably silicon dioxide or silicon nitride, prior to the formation of the cavity 1. The oxide layer 4 is disposed between the semiconductive sheet 2 and the substrate 3 when the two are bonded together to form a composite sheet. Prior to the bonding process, the substrate 3 is formed with a metallic pad 5 to which is connected an electrical feedthrough 6 which terminates exteriority of the cavity 1.

Figure 2:
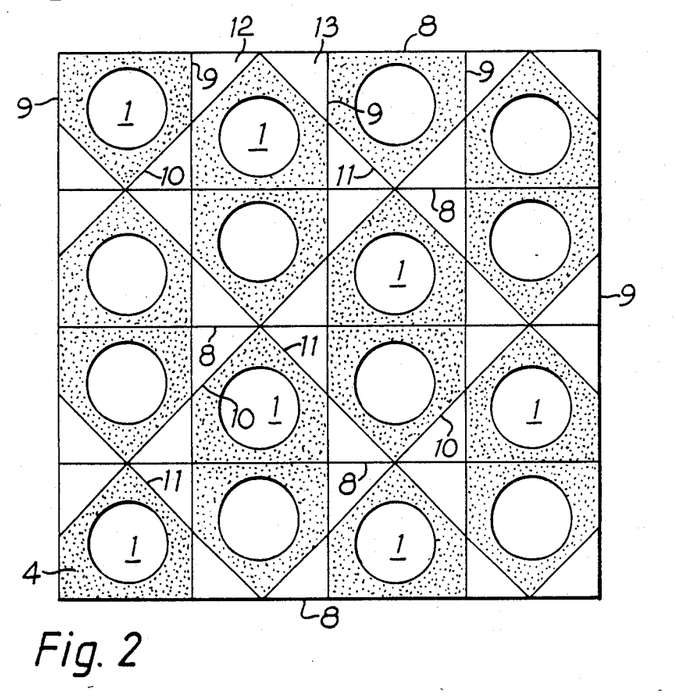
FIG. 2 is a diagrammatic plan view of the batch production of the pressure sensor of FIG. 1.

Batch production of the pressure sensor of FIG. 1, in accordance with one aspect of the present invention, may be achieved by taking a sheet of semiconductive material, such as silicon, and forming therein a plurality of cavities 1 which are arranged in a plurality of rows and columns as illustrated in FIG. 2. It will be seen from FIG. 2 that the cavities 1 are circular in plan view and that the centres of adjacent cavities in a given row (or column) are offset with respect to one another, the locus of the centres of the cavities 1 in a given row taking the form of a sawtooth. The sheet of semiconductive material 2 is provided with the silicon dioxide or nitride layer 4 on the side thereof from which the cavities 1 are formed, the cavities being formed by etching through the oxide layer and into the semiconductive material. Each cavity 1 is surrounded by an annular peripheral recess or trench 1'. The depth of the trench can be varied so as to alter the pressure range of the associated sensor.

Simultaneously with forming the cavities 1 and surrounding trenches 1', there are formed (by etching) recesses at two corners 12, 13 of each sensor to a depth substantially each to the depth of the trenches 1'.

Figure 3:
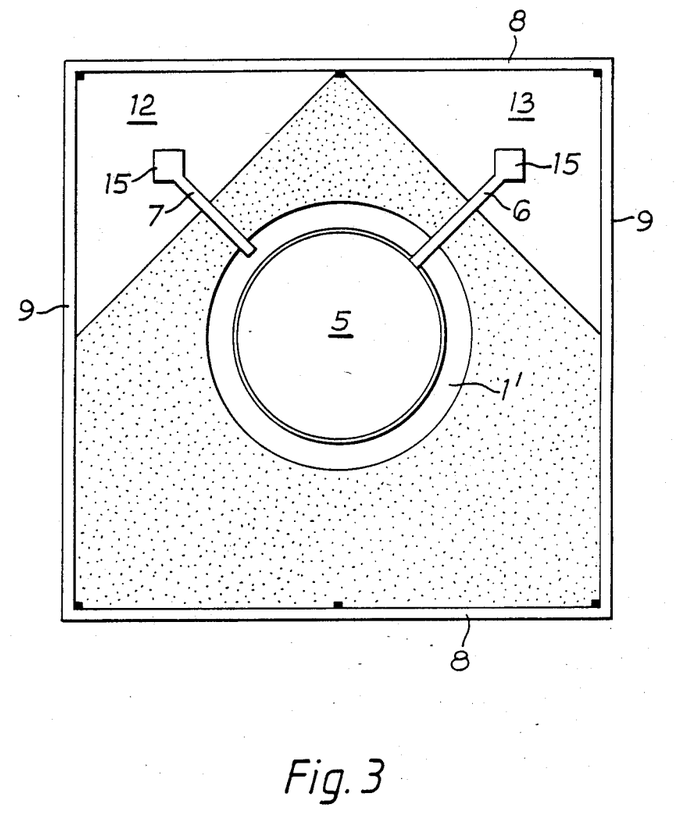
FIG. 3 is a detail, to a larger scale, of FIG. 2, FIGS. 4A–4G are a diagrammatic representation of steps in the batch production process of the present invention.

A sheet of glass such as Corning 7070 or Schott 8248 is taken to provide the substrate 3 and the glass has deposited on one side thereof a series of circular electrodes 5, together with associated feedthroughs 6, these feedthroughs being those which are electrically connected to the respective electrodes 5. However, as seen in FIG. 3, dummy feedthroughs 7 are also provided for a preselected number of sensors in a given batch, which dummy feedthroughs are substantially identical to the feedthroughs 6 but electrically disconnected from the electrodes 5. The electrodes 5 and feedthroughs 6 and 7 may be of a two-layer construction; a layer of NiCr (nickel chromium) in contact with the substrate 3 and a layer of Au (gold) in contact with the silicon oxide 4. The electrodes 5 are formed on the glass substrate 3 in a manner such that when the semiconductive sheet 2 is placed thereon, the electrodes 5 are disposed within the respective cavities 1 by way of being on the side of the cavity opposite the diaphragm D formed by the cut-away semiconductive material. The semiconductive sheet 2 and substrate 3 are then bonded together, preferably using the field assisted bonding technique which is sometimes referred to as anodic bonding or Mallory bonding or electrostatic bonding. The resulting bonding between the semiconductive sheet 2 and the substrate 3 via the dioxide layer 4, and between the metallic feedthroughs 6 and 7 and the dioxide layer 4 and substrate 3 producing a vacuum reference cavity 1 for each sensor. This enables the capacitance between the semiconductive diaphragm D and the electrode 5 on the substrate to be used as an absolute pressure gauge. The substrate 3 and the dioxide layer 4 are deformed during the bonding step so as to bond these two components together to provide an hermetic seal, and the thermo-compression resulting from the field assisted bonding technique physically draws the dioxide layer 4 and subsrate 2 into extremely close contact with the feedthroughs 6 and 7 to an extent such that the hermetic seal is maintained as discussed in greater detail in co-pending British Patent Application No. (8718637) which is incorporated herein by reference.

Before or after bonding the semiconductive sheet 2 to the substrate 3, the substrate is divided into a plurality of rectangles by a series of horizontal (as seen in FIG. 2) grid lines 8 and a series of vertical (as seen in FIG. 2) grid lines 9, these grid lines 8 and 9 thus being orthogonal to one another. Thus the grid lines 8 and 9 delineate the respective pressure sensors and once bonding of the semiconductive sheet 2 to the substrate 3 has been achieved, the semiconductive sheet 2 is cut along a series of lines 10 and a series of lines 11, with the lines 10 and 11 being orthogonal to one another but at an angle to the grid lines 8 and 9. Conveniently, this angle is of the order of 45°. The cuts along lines 10 and 11 are of a depth such that they break into the corner recesses 12 and 13 of each pressure sensor. The grid lines may be produced by etching or otherwise.

Once the cuts 10 and 11 have been effected, the composite sheet of pressure sensors is now diced or divided along the grid lines 8 and 9 so as to produce individual pressure sensors. This operation also serves to remove the semiconductive layer from the corner regions 12 and 13 of each sensor to reveal the terminal ends of the feedthroughs 6 and 7. Thus the feedthroughs are exposed for electrical connection to wires or other electrical conductors. Thus electrical output signals can be taken from the feedthrough 6, which signals vary according to the flexure of the diaphragm D occasioned by applied pressure and which varies the capacitance of the sensor.

Prior to the dicing step, the semiconductive sheet 2 may be lapped, ground or otherwise reduced in thickness so as to provide the desired pressure range for the pressure sensors. For example, if a 600 micrometer semiconductive sheet 2 is employed, a 0-2,000 psi pressure sensor would be produced, whereas reducing the semiconductive sheet thickness to 150 micrometers produces a 0-30 psi sensor, these thicknesses referring in fact to the thickness of the actual diaphragm D of each sensor with a cavity diameter of substantially 4.8 mm. With a cavity diameter of 2 mm, a 380 micrometer thick diaphragm would produce a 0-2000 psi sensor, and a 70 micrometer diaphragm would produce a 0-30 psi sensor.

It will be appreciated that the same basic fabrication technique can be employed to produce a sheet of pressure sensors and then the sheet lapped, ground or otherwise reduced as regards the semiconductive layer to produce a required pressure range. A portion of the sheet could then be diced so as to produce individual pressure sensors of that range and then the remainder of the composite sheet reduced still further as regards the semiconductive layer to provide sensor of a different pressure range, and so on. Alternatively, whole composite sheets can be treated so as to give pressure sensors of the same pressure range.

The cavities 1 formed in the semiconductive sheet 2 are preferably 2 micrometers deep and, as already stated, 4.8 mm in diameter. The trenches 1' may be of a depth of the order of 25 micrometers, with the corner recesses 12, 13 of a similar depth. The overall dimension of each pressure sensor may be 8 mm × 8 mm and the grid lines 8 and 9 may be 200 micrometers in width to allow ready dicing of the composite sheet into individual pressure sensors.

However, the sensors may be a quarter the size, i.e. 4 mm × 4 mm and in this case, the cavities may be 1 to 2 micrometers deep with the trenches '1' remaining of the order of 25 micrometers in depth.

The use of dummy feedthroughs 7 for a number of sensors in a batch allows the parasitic capacitance of the pressure sensors of that batch to be monitored and thus provide a quality control tool.

Figure 9:
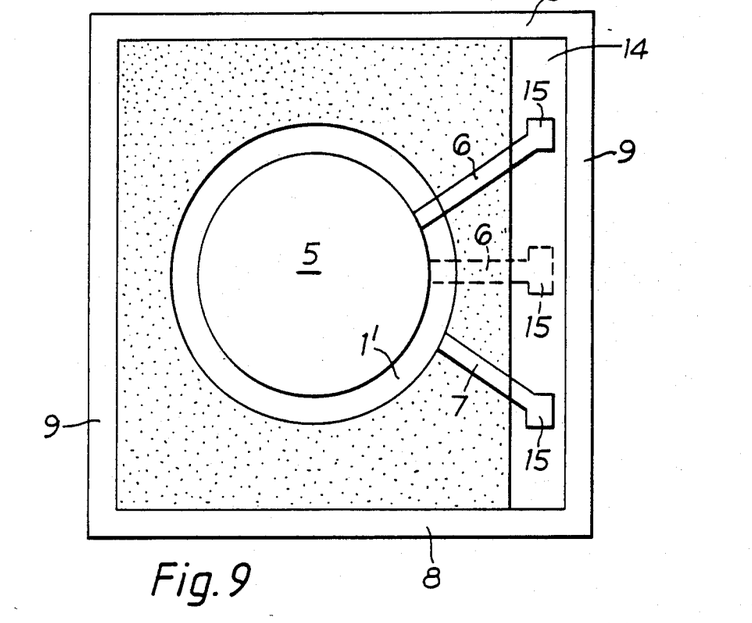
FIG. 9 is a view similar to that of FIG. 3 but showing an alternative sensor.

FIG. 9 is similar to that of FIG. 3 but shows an alternative embodiment in which the cuts to reveal the feedthroughs 6 are made parallel to one edge of the sensors so as to provide rectangular recesses 14 as opposed to the triangular recesses 12,13 of the embodiment of FIG. 3. FIG. 9 illustrates one of the sensors provided with an actual feedthrough 6 and a dummy feedthrough 7. In these sensors when no dummy feedthrough is provided, the feedthrough 6 could be positioned as indicated by broken lines in FIG. 9.

Figure 10:
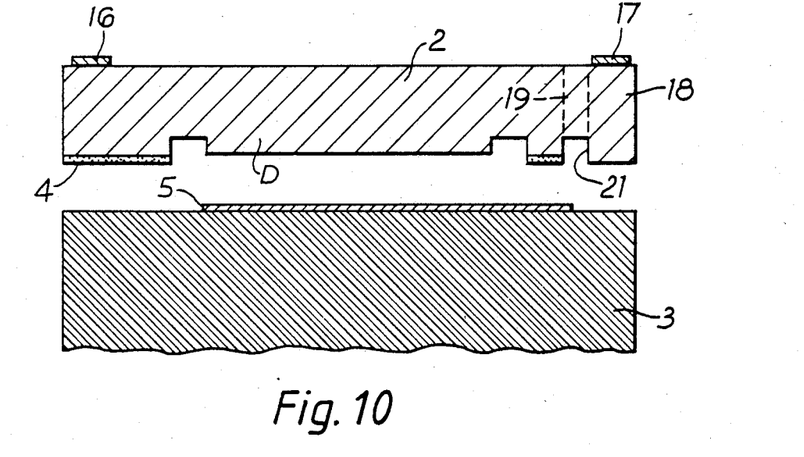
FIG. 10 is a view similar to that of FIG. 1 but showing a still further alternative embodiment.

The attachment of electrical leads to the contact pads 15 provided at the ends of the feedthroughs 6 is by wire bonding, with the glass and semiconductor bonding pads being offset by the thickness of the semiconductor. However, this arrangement is unsuitable for the so-called "solder bump" attachment technique which requires a planar surface for the connections. It is possible to use existing semiconductor planarising techniques to produce bonding pads at the same surface on the semiconductive layer 2 as indicated at 16 and 17 in FIG. 10 which shows such an arrangement prior to the bonding step. The pad 16 is associated only with the semiconductive layer 2, whereas the pad 17 is associated with the contact pad 15 on the end of the feedthrough 6, via the end or side portion 18 of the semiconductive layer 2 which is electrically insulated from the main body of that layer by a saw cut indicated at 19 in FIG. 10. This saw cut 19 is made after the bonding process and a trench 21 is formed at the same line as the trench 1' in order to prevent the cutting operation causing damage to the feedthrough 6. It will be noted that the portion 18 of the semiconductive layer 2 will be in electrical contact with the feedthrough pad 15 when the bonding process has been completed by virtue of the fact that this portion is devoid of any insulating layer 4.

An even more specific example of batch producing capacitive sensors in accordance with the present invention is set out below.

EXAMPLE

Fabrication of Silicon Capacitive Pressure Sensors

For the batch production of silicon capacitive pressure sensors, the basic components used were a silicon wafer 2 and a glass disc 3 of similar diameter. A typical process for preparing the silicon wafer is given hereinafter under the heading "Silicon Sheet Processing". If p-type silicon is used, items 3 to 8 thereof can be omitted.

The glass components were machined into discs e.g. 75 mm diameter, 4 mm thick (in order to provide the required rigidity to the sensors as well as to accommodate high pressure devices and registration flats machined to match those aligned with the grid pattern on the silicon wafers.

The glass discs were polished to a surface finish better than 25 nm RMS.

Figure 8:
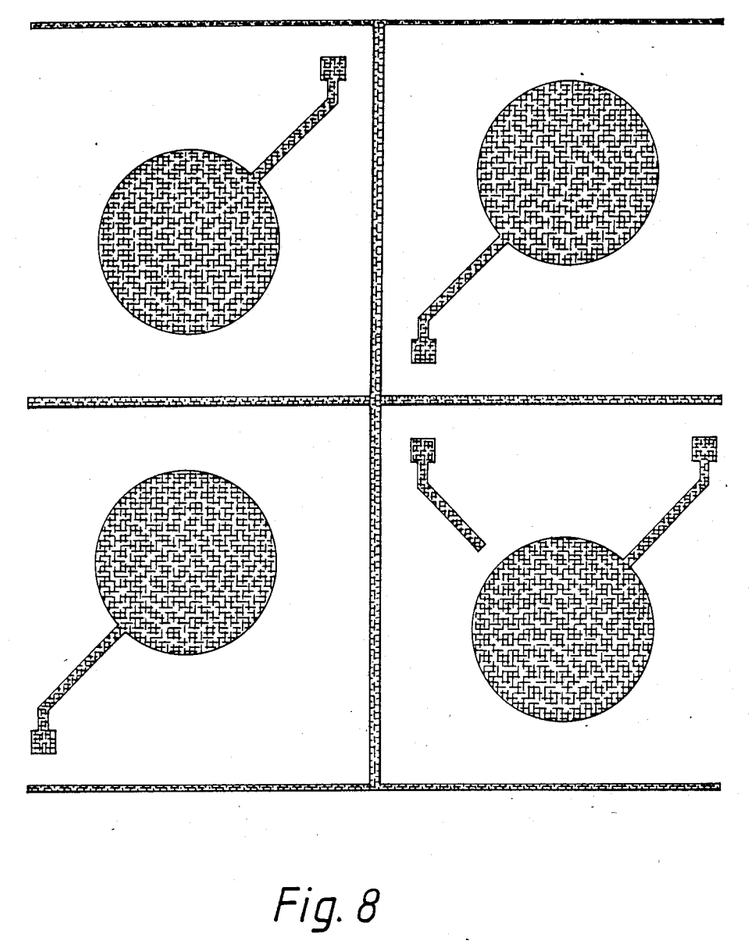

The glass discs were then patterned with positive resist using the mask of FIG. 8. It should be noted that this mask only has a dummy lead or feedthrough 7 on one out of four sensors for this quality control purpose referred to above.

The glass discs were then coated sequentially with 10 nm of nichrome and 30 nm of gold using magnetron sputtering.

The photoresist was then removed leaving the metalisation 5,6,7 as defined by the mask of FIG. 8.

The silicon and glass components were then bonded together using field assisted bonding. This operation was performed in a vacuum to ensure a 'zero' pressure reference cavity 1 in each pressure sensor and to ensure good sensor temperature stability.

The samples were then heated to a temperature of 450° C. and a voltage of 2 kV (silicon positive) applied across the components after they had been pressed together (oxide facing 4 against metallised glass 3). The voltage was applied for a period of 10 minutes.

This produces an hermetic seal between the internal cavity 1 and the outside with the metal leads or feedthrough 6,7 connecting the two regions, the oxide facing 4 and the glass 3 having deformed around the edges of the feedthroughs to produce no leakage path, i.e. an hermetic seal.

Having bonded the components, the next process step was to deposit aluminium contact pads (approx. 1 micrometer thick) onto the silicon back side of each of the individual sensors. This is achieved using magnetron sputtering, in conjunction with a suitably machined mask. If another metal (e.g. gold/antimony) is used instead of aluminium, stages 2-8 of the silicon processing can be omitted for n-type silicon.

For forming devices of lower pressure ranges, the silicon is precision lapped, prior to this deposition process, to the required thickness.

The next process step involved provision sawing. First diagonal cuts 10,11 were made into the silicon 2 following the diagonal registration flat on an 11.3 mm pitch. These cut 10,11 stopped within 25 micrometers of the glass-silicon interface. The assembly was then diced along the registration lines 8,9 into individual sensor components. This process caused the removal of the recessed corners 12,13 of each silicon section 2, hence exposing the contact pads on the glass 3.

The individual devices were then attached to headers, and gold leads wire bonded to the contact pads on the glass 3 and silicon 2.

After attaching a can containing a pressure port, the sensors are ready for testing.

It is essential that the silicon and glass preparation and the bonding of the two components are performed under clean conditions.

SILICON SHEET PROCESSING

Figures 4, 4A, 4G:
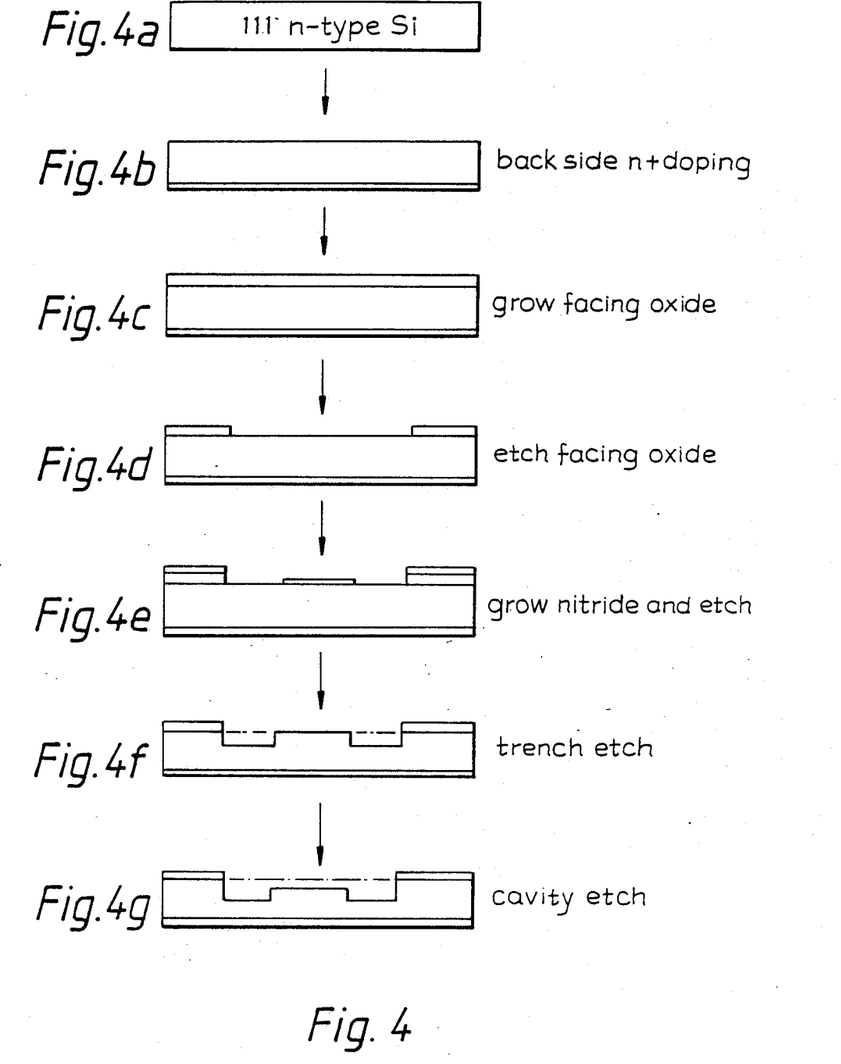

Material:

0.02 ohm-cm <11> Sb-doped 3" wafers.
1. RCA clean silicon wafers (FIG. 4a)

Back Side n+ Doping

2. Initial oxide: Grow 0.6 micrometers oxide in wet $O_2$; T=1100° C.
3. Spin resist on front.
4. Strip oxide from backs of wafers in 7:1 Buffered HF (BHF).
5. Strip resist in fuming nitric acid.
6. Phosphorus deposition furnace ($POCl_3$): T=1050° C.; time=30 m; dry $N_2$.
7. Strip oxide in 7:1 BHF (FIG. 4b).

Grow Facing Oxide

9. Grow thermal oxide.
T=1100° C.; wet $O_2$; time=180 min; expected $d_{ox}$=0.6 micrometers (FIG. 4c).
10. Measure oxide thickness, $d_{ox}$, by Nanospec. interference method.

Pattern Generation

Figure 5:
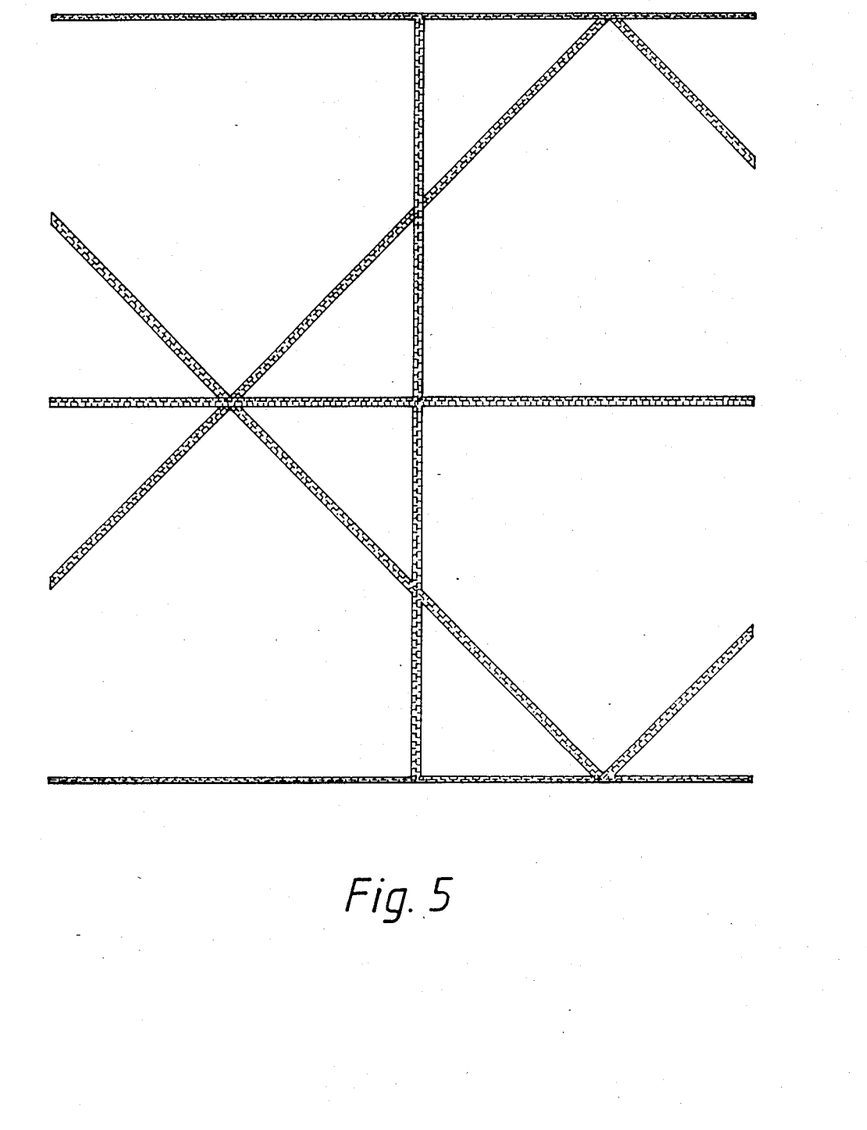
FIGS. 5 to 8 illustrate various masks used in process of FIG. 4.
Figure 6:
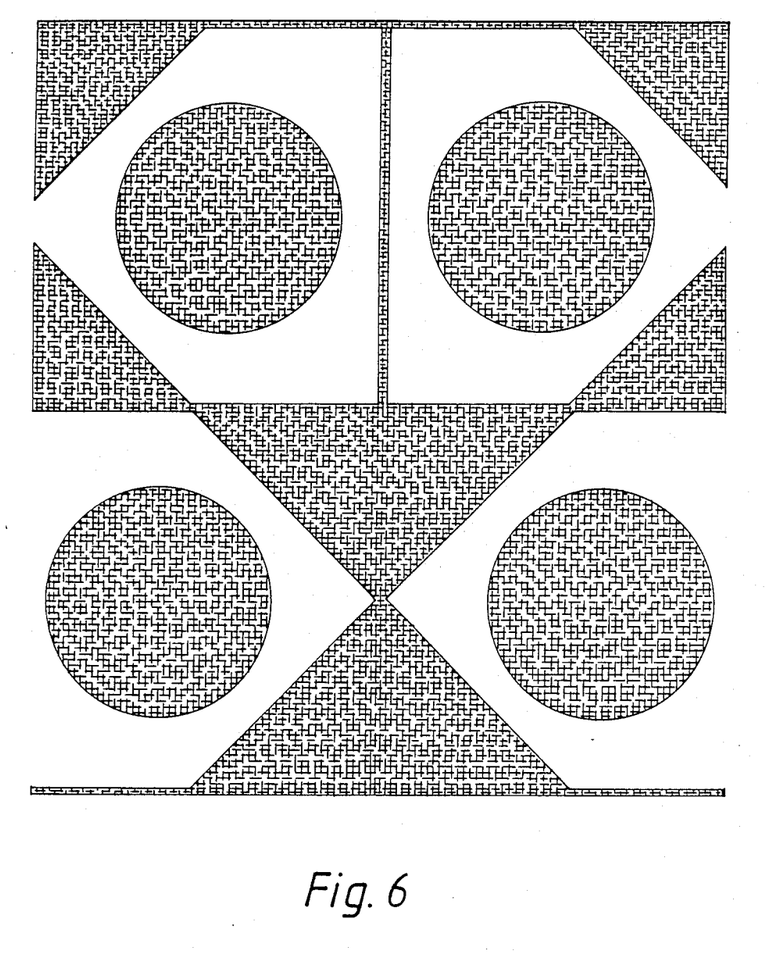
Figure 7:
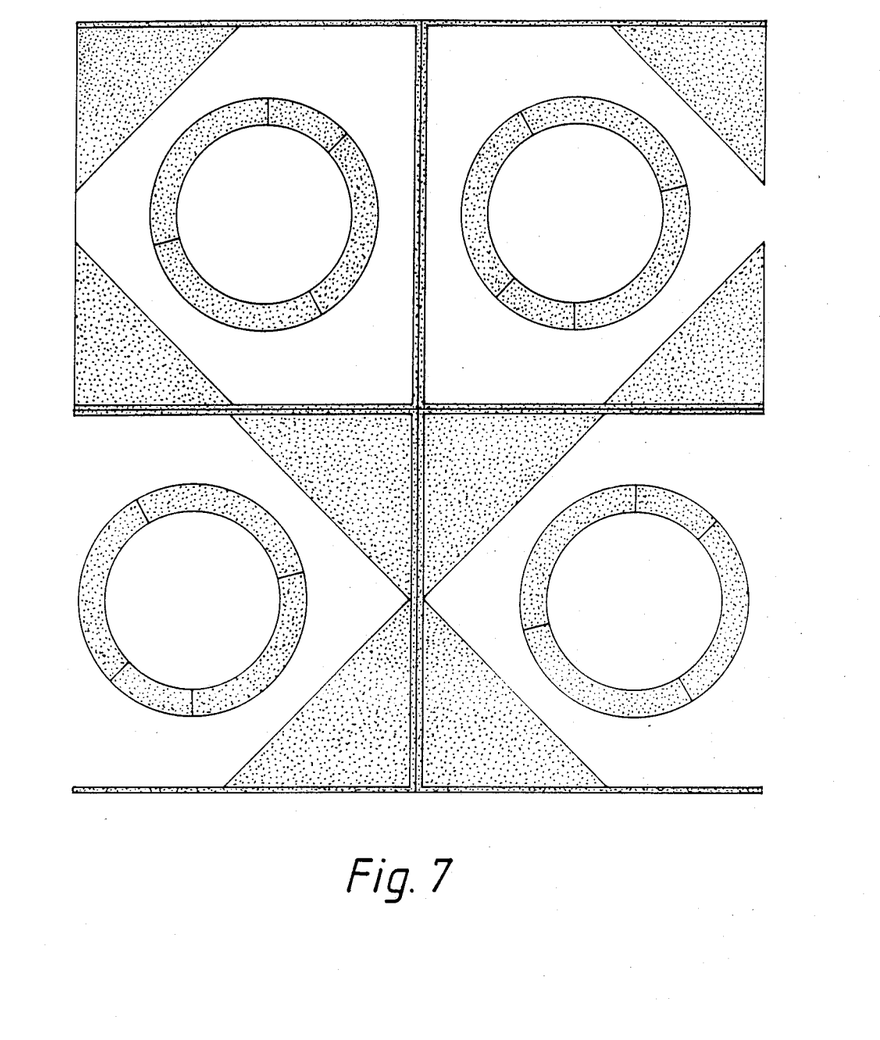

11. Photolithography +ve resist using the mask of FIG. 5.
12. Machine registration flats aligned with grid pattern (including diagonal) of mask of FIG. 5. Wafers must then be thoroughly cleaned.
13. Photolithography +ve resist using the mask of FIG. 6.
14. Etch oxide in 7:1 BHF; expected etch time=12 min. (FIG. 4d).
15. Strip resist in fuming nitric acid.
16. Deposit $Si_3N_4$; $d_{Ni}$=150 nm (FIG. 4e).
17. Photolithography, +ve resist using the mask of FIG. 7.
18. Dry etch $Si_3N_4$; $d_{Ni}$=150 nm; Overetch by 50%.
19. Strip resist in fuming nitric acid.

Trench Etch

20. Silicon etch. Dip etch oxide in 20:1 BHF for 15 secs; then silicon etch in $HF:HNO_3:CH_3COOH$ for 2-3 mins. (Follows the mask of FIG. 7).
21. Measure etch depth. Repeat step 18 for time calculated to give an etch depth of 25 micrometers for the trenches 1' (FIG. 4f).
22. Strip $Si_3N_4$ in orthophosphoric acid; T=160° C.; strip time=90 mins.

Silicon Etch

23. Dry etch Si in $CCl_4$ to a depth of 2 micrometers (follows the mask of FIG. 6) to form the cavity 1 (FIG. 4g).
24. Measure thickness $d_{ox}$ at several points to ensure uniformity.

It will be seen that the present invention affords a method of batch producing capacitive pressure sensors which represents a significant advance in the art. A basic fabrication technique can be employed using semiconductive layers or sheets of a thickness which are readily handled and yet which can be reduced in the final stages of production to provide the required pressure range for a given sensor.

We claim:

1. A method of batch producing capacitive pressure sensors comprising the steps of:
   (a) providing an electrically insulating layer on one side of a sheet of a semiconductive material,
   (b) forming an array of cavities in said sheet by removing a patterned part of the insulating layer and part of the semiconductive material thereunder, the remaining portions of the sheet in each said cavity acting as a diaphragm, the cavities being arranged in a plurality of rows and columns on the semiconductive sheet,
   (c) forming at least one recess of a predetermined depth in the semiconductive sheet in association with each cavity by removing a patterned part of the insulating layer and at least part of the semiconductive material thereunder,
   (d) bonding the semiconductive sheet to a non-conductive substrate to form a composite sheet with the insulating layer in contact with the substrate, the substrate being provided with electrodes for the cavities in the semiconductive sheet and arranged such that they are located within the cavities on bonding of the semiconductive sheet to the substrate, each electrode having an electrical feedthrough extending therefrom and terminating at a point outside the associated cavity,
   (e) providing delineation lines for the plurality of pressure sensors,
   (f) cutting the semiconductive sheet from the side opposite that provided with the insulating layer to a depth, and at a position, so as to break into each recess to reveal the terminal end of each electrical feedthrough, and
   (g) dicing the composite sheet along the delineation lines so as to separate the pressure sensors one from another.

2. A method according to claim 1, wherein each recess opens to at least two sides of the associated sensor, when the latter is finally formed, and the associated electrical feedthrough terminates with the recess and is subsequently revealed for the direct attachment thereto of an electrical connection.

3. A method according to claim 1, wherein each electrical feedthrough terminates beyond the associated recess, the latter serving, together with the related cut, to insulate the main body of the semiconductive sheet from that portion in contact with the associated feedthrough and to which portion an electrical connection for the feedthrough is made.

4. A method according to claim 1, and comprising the further step of providing a peripheral recess around each cavity.

5. A method according to claim 1, wherein both the cavity-forming and recess-forming steps comprise removing part of the semiconductive sheet.

6. A method according to claim 2, wherein the cuts are arranged to delineate two corner regions of each sensor.

7. A method according to claim 1, wherein the cuts are parallel to an edge of each sensor so as to delineate a strip at that edge of the sensor.

8. A method according to claim 2, wherein the cutting step is implemented prior to the dicing step, whereby the latter results in portions of the semiconductive sheet delineated by the cuts being removed to reveal the terminal end of each electrical feedthrough for subsequent connection to external electrical circuitry.

9. A method according to claim 2, wherein the dicing step is implemented prior to the cutting step, whereby each individual sensor is cut to reveal the terminal end of each electrical feedthrough associated therewith.

10. A method according to claim 1, wherein adjacent cavities in a given row or column are offset one from the other.

11. A method according to claim 1 and further comprising the step of reducing the thickness of the semiconductive sheet to a required thickness prior to the dicing step.

12. A method according to claim 1 and further comprising the step of forming in respect of each of a predetermined number of sensors in the batch a second electrically-conductive feedthrough on the substrate substantially equal in surface area to the other feedthrough for a given sensor and extending from the corresponding electrode, but not being electrically connected thereto.

13. A method according to claim 1, wherein each electrical feedthrough in each sensor is hermetically sealed between the insulating layer and the substrate.

14. A method according to claim 3 further comprising the step of forming in respect of each of a predetermined number of sensors in the batch a second electrically-conductive feedthrough on the substrate substantially equal in surface area to the other feedthrough for a given sensor and extending from the corresponding electrode, but not being electrically connected thereto, and wherein each electrical feedthrough in each sensor is hermetically sealed between the insulating layer and the substrate.

15. The method according to claim 4 wherein both the cavity-forming and recess-forming steps comprise removing part of the semiconductive sheet.

16. A method according to claim 2 wherein adjacent cavities in a given row or column are offset one from the other.

17. A method according to claim 16 and further comprising the step of forming in respect of each of a predetermined number of sensors in the batch a second electrically-conductive feedthrough on the substrate substantially equal in surface area to the other feedthrough for a given sensor and extending from the corresponding electrode, but not being electrically connected thereto.

18. A method of producing a capacitive pressure sensor comprising the steps of:
   (a) forming at least one cavity having a bottom surface in a sheet of semiconductive material,
   (b) bonding the sheet of semiconductive material to a non-conductive substrate, whereby at least one totally enclosed cavity is produced with that portion of the semiconductive sheet forming said bottom surface of the cavity serving as a diaphragm, and then
   (c) removing part of said portion of the semiconductive sheet acting as a diaphragm from the side of the semiconductive sheet opposite to that which is bonded to the substrate so as to provide the diaphragm with a predetermined thickness appropriate to the required pressure range of the sensor.

* * * * *